3,004,985
MERCURY PROTO- AND HEMATOPORPHYRINS
Misao Obika and Morie Sasaki, Tokyo, Katutaro Tanaka, Ichikawa, and Noboru Iijima, Tokyo, Japan, assignors to Daiichi Seiyaku Co., Ltd., Tokyo, Japan, a corporation of Japan
Filed May 7, 1957, Ser. No. 657,525
Claims priority, application Japan Feb. 7, 1957
4 Claims. (Cl. 260—314)

The present invention relates to new chemical compounds and process for preparing said compounds and has for its object to provide new and novel chemical compounds which are useful and effective, inter alia, as medical drugs such as diuretics, more particularly mercury-hematoporphyrin and mercury-protoporphyrin.

Among the objects of the invention is the provision of said compounds for use, inter alia, as diuretics.

Another object of the present invention is to provide dialkali salts of mercury compounds of hematoporphyrin and protoporphyrin in a form especially preferable for a preparation pro injection.

The mercury-porphyrins and their dialkali salts produced by the process according to the present invention are all dark brown powders. Moreover, the mercury porphyrins are not soluble in water, whereas their dialkali salts are substances which are easily soluble in water and soluble to a very slight degree in methanol, but insoluble in an organic solvent, such as chloroform, benzene, acetone and ether.

The absorption spectra of the products of the present invention are shown in the accompanying drawings, which illustrate comparative figures of the measurements of absorption spectra of the novel chemical compounds produced in accordance with the present invention with those of starting materials and in which FIG. 1 is a comparative graph of a mercury complex salt of hematoporphyrin with a disodium salt of hematoporphyrin.

In each figure, a wave length $m\mu$ is shown along the abscissa and an optical density ($-\log T$) along the ordinate.

Figure 1:
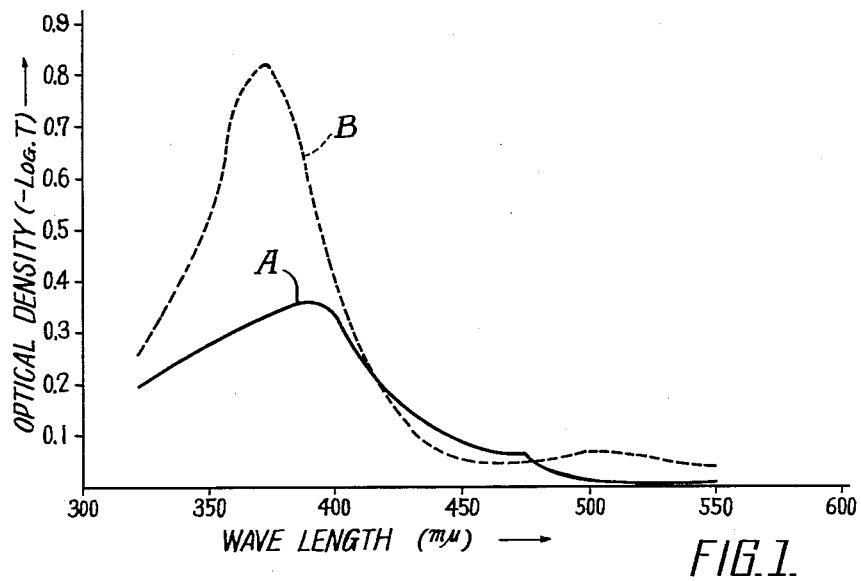
Figure 2:
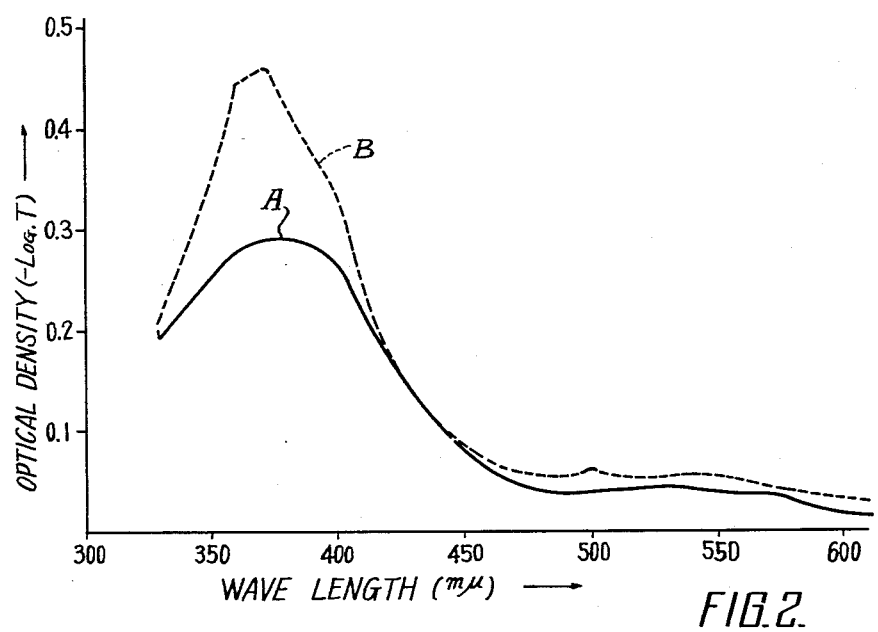
FIG. 2 is a comparative graph of an aqueous solution of a mercury complex salt (disodium salt) of hematoporphyrin with a disodium salt of protoporphyrin.

As shown at A in FIGS. 1 and 2 of the drawings, the maximum absorption value is 383–390 $m\mu$ (in an aqueous solution) for a mercury complex compound (disodium salt) of hematoporphyrin, and 336 $m\mu$ (in an aqueous solution) for a mercury complex compound (disodium salt) of protoporphyrin, both of which migrate somewhat to the long wave-length side in an alkali solution of the same concentration as compared with the case of hematoporphyrin, the starting material (represented by the B curve).

Figure 3:
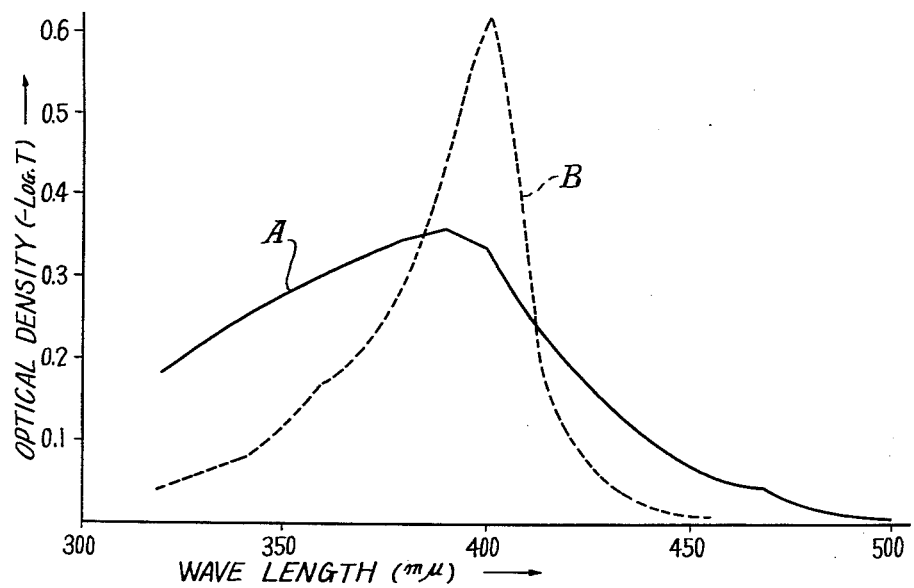
FIG. 3 is a comparative graph of a mercury complex salt (disodium salt) of hematoporphyrin with a disodium salt of hematoporphyrin which is produced by treating mercury complex salt (disodium salt) of hematoporphyrin with hydrochloric acid and separating the mercury.

Referring to an example of one of the products produced according to this invention, mercury-hematoporphyrin does not emit fluorescence, while the maximum absorption value ranges from 400 to 401 $m\mu$ when an aqueous solution ($\frac{1}{100000}$ mol concentration) of the disodium salt of said compound is acidified by the addition of concentrated hydrochloric acid as shown in FIG. 3, and emits a remarkable red fluorescence upon ultraviolet ray treatment. This coincides with the 401 $m\mu$ of the absorption value of hematoporphyrin in a hydrochloric acid solution as well as its fluorescence as referred to in the literature (Fisher's: Die Chemie des Pyrrols, II Band, p. 589). This fact proves that the mercury is in the form of a complex compound similar to hemin, the iron compound of protoporphyrin, in which an iron atom combines with protoporphyrin. Accordingly, the novel compounds according to the present invention can be represented by the following constitutional formulae:

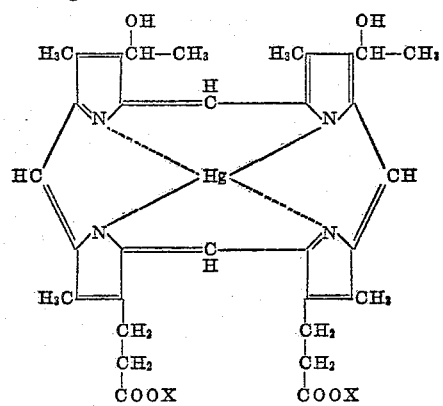

Mercury-hematoporphyrin and its alkali salt wherein X represents a hydrogen atom or an alkali metal.

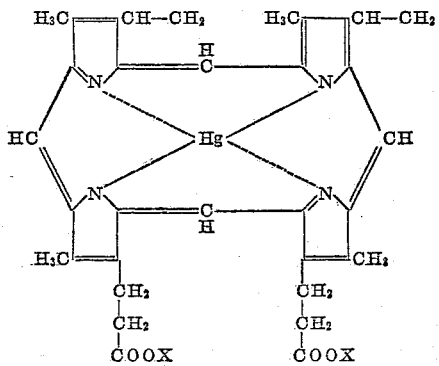

Mercury-protoporphyrin and its alkali salt wherein X represents a hydrogen atom or an alkali metal.

As hematoporphyrin and protoporphyrin are produced from hemin obtained by the Schalfejeff method having been improved by Nencki and Zaleski, they are suitably referred to by formal nomenclature as hematoporphyrin IX and protoporphyrin IX respectively. The chemical compounds according to the present invention are, in fact, mercury complex compounds thereof. Generally, hematoporphyrin and protoporphyrin emit a red beautiful fluorescence by treatment with ultraviolet rays as set forth above. However, they have the characteristic that fluorescence disappears completely when they become metal porphyrins, particularly when heavy metal is introduced in porphyrin to form a complex compound thereof. The mercury porphyrin according to this invention displays no fluorescence by ultraviolet ray treatment. The same is also true with the dialkali salt.

Up to the present there have been examples indeed wherein hematoporphyrin and protoporphyrin have been caused to combine with metals, such as zinc, copper, cobalt, nickel, iron and magnanese and similar metals; however, the present inventors have been the first to cause hematoporphyrin and protoporphyrin to combine with mercury to obtain these novel complex compounds. In addition, the present invention is the first in which a metal porphyrin has successfully been used as a therapeutic agent as herein described. When the novel products of the present invention are used as medical drugs, they can be used orally, although it is the most preferable to use them as injection agents. While it is necessary to dissolve them in water for this purpose, it is sufficient that said mercury-prophyrins are caused to dissolve by means of a caustic alkali or caused to dissolve in water after they are converted to water soluble dialkali salts. However, it should particularly be noted in this case that mercury tends strongly to precipitate due to aging when said dialkali salts are reserved for long in a state of aqueous solution. Therefore, it is most advisable that the above-mentioned dialkali salts be put in ampoules in a powdered form and kept under substitution of an inert gas, if possible, only to be converted into an aqueous solution when ready for use.

The novel compounds prepared according to the present invention have a diuretic action, which any organic mercury compound generally has. Moreover, besides the diuretic effect due to the inhibitory action of sodium in renal tubules, these compounds presumably possess also cholagogue action, and as a result these compounds are valuable as effective diuretic agents by the cooperation of the aforesaid effects with an improving action to metabolism.

As for the preparation of the mercury complex compounds according to this invention, a general method for preparing metal porphyrin can, of course, be used. Thus a process may be used wherein metallic salt is caused to react with porphyrin in the presence of an organic solvent or glacial acetic acid, or wherein porphyrin is beforehand esterified and the ester thus obtained hydrolyzed after being converted to a metallic complex compound. As the compound thus obtained is a free chemical compound, it is sufficient merely to treat the compound with caustic alkali in order to convert said compound to the dialkali salt. However, the aforesaid processes are not appropriate for providing a drug having high purity, because the mercury complex salt is particularly unstable to acid and decomposition products are formed in the course of the production. Accordingly, in order to avoid such a defect, alkali is added beforehand to an organic solvent, such as methanol, and then the mercury salt of an organic acid, such as mercuric acetate, is caused to react with porphyrin in the presence of said organic solvent. In this way there is no fear of the decomposition of the mercury complex salt arising as the free acid forming in the course of the reaction is neutralized. Therefore, a mercury complex salt of porphyrin-disodium can be obtained in a high purity.

Another advantageous method for the preparation of the novel compounds is that wherein an alcoholate of an alkali metal is first prepared and the alcoholate is then converted to an alkali salt of porphyrin by adding porphyrin thereto. The alkali salt thus prepared is caused to react with a solution of mercuric salt of an organic acid such as mercuric acetate in an organic solvent. The dialkali mercury complex salt of the respective porphyrin may then be obtained in high purity. This method for preparing the novel compounds is most suitable for mass production. Moreover, in order to convert said dialkali salt into an insoluble mercury porphyrin, said dialkali salt can be converted first to an aqueous solution and then neutralized with acid to precipitate insoluble mercury porphyrin.

The mercury porphyrin prepared according to the above-mentioned process has no fluorescence in an aqueous solution.

The present invention is further described in the following examples, which serve to illustrate the method of preparation of the mercury porphyrins of this invention, and it is to be understood that the invention is not to be limited thereto.

*Example 1*

2.0 grm. of hematoporphyrin is dissolved in 20 cc. of pyridine and 20 cc. of chloroform, and to the solution thus obtained is added dropwise with stirring over a period of 20 minutes a solution of 1.6 grm. mercuric acetate in 10 cc. pyridine (or glacial acetic acid). Thereafter, the solution thus prepared is stirred for one hour at 60 to 75° C. and cooled. Subsequently 150 cc. of ether is added thereto to precipitate crystals. The crystals are filtered and washed with acetone and ether and dried at 40° C.

The molecular formula of mercury complex salt of hematoporphyrin thus obtained is shown below:

$$C_{34}H_{36}O_6N_4Hg$$

The product is insoluble in water, ether, chloroform and acetone, slightly soluble in methanol and readily soluble in alkali.

*Example 2*

2.1 grm. of dimethylester of hematoporphyrin is dissolved in 50 cc. of chloroform and a solution of 2 grm. of mercuric acetic acid in 40 cc. of glacial acetic acid is added dropwise to the chloroform solution over a period of 20 minutes at room temperature. The reaction solution is washed 4 times with 100 cc. of water, after being stirred for one hour, to deacidify and to distill off ¾ of the chloroform, cooled and then mixed with 200 cc. of ether. A dimethylester mercury complex salt of hematoporphyrin is thereby precipitated and the crystals thus obtained are filtered, washed with ether and dried.

1.5 grm. of mercury complex salt obtained by the above procedure is added to 120 cc. of 0.5% caustic potassium solution and heated at 80° to 95° C. for one hour, and neutralized with 60 cc. of 1% acetic acid solution after cooling. Thereafter, crystals are precipitated which are filtered and washed with water, methanol and ether, and then dried at 40° C. In this manner a mercury complex salt of hematoporphyrin is obtained.

*Example 3*

2.1 grm. of hematoporphyrin is dissolved in 150 cc. of 90% acetone and 1.0 grm. of mercuric acetate is dissolved at room temperature with stirring in a mixed solution containing 30 cc. of acetone, 6 cc. of water and three drops of glacial acetic acid. The solution thus obtained is then added dropwise to the first named acetone solution of hematoporphyrin over a period of one hour. Then, crystals are precipitated, and after stirring for 20 minutes, the crystals are filtered, washed with water, alcohol, ether and dried at 40° C. A mercury complex salt of hematoporphyrin is thus obtained.

*Example 4*

3 grm. of hematoporphyrin is dissolved in 60 cc. of 2% caustic potassium solution, and then 240 cc. of methanol is added thereto. On the other hand, 2.4 grm. of mercuric acetate is dissolved in a mixed solution containing 150 cc. of methanol and 15 cc. of pyridine. Then the mercuric acetate solution is added dropwise to the aforesaid potassium solution of hematoporphyrin over a period of 20 minutes at room temperature with stirring, and the reaction is completed after one hour while stirring at room temperature. When 800 cc. of ether is added and agitated thoroughly after the reaction has been completed, a potassium mercury salt of hematoporphyrin precipitates out. The precipitate is filtered and washed with a mixed solution containing 60 cc. of ether, 35 cc. of methanol and 5 cc. of water, then washed with 100 cc. of ether and dried at 40° C. Dipotassium salt of mercury hematoporphyrin is obtained in an amount of 4.0 grm. (91.3% of the theoretical yield.)

The product is a dark brown powder, readily soluble in water, does not emit fluorescence, hardly soluble in methanol and insolube in chloroform, benzene, acetone and ether. The quantitative value of mercury is practically coincident to the theoretical value. The molecular formula is as shown:

$$C_{34}H_{30}O_4N_4HgK_2$$

*Example 5*

1.9 grm. of protoporphyrin is dissolved in 2% potassium solution and then 160 cc. of methanol is added thereto. On the other hand, 1.6 grm. of mercuric acetate is dissolved in a mixed solution containing 100 cc. of methanol and 10 cc. of pyridine.

The said mercuric acetate solution is added dropwise with stirring over a period of 10 minutes to the above-mentioned potassium solution of protoporphyrin at room temperature. The reaction is completed by further stirring for 30 minutes at a room temperature. 550 cc. of ether is added after the reaction is completed, and the reaction mixture is then treated as in Example 4. Dipotassium salt of mercury protoporphyrin is obtained in an amount of 2.6 grm. (91.6% of the theoretical yield).

The product is dark brown powder, easily soluble, does not emit fluorescence, slightly soluble in methanol, and insoluble in chloroform, benzene, acetone and ether. The quantitative value of mercury is coincident practically with the theoretical value. The molecular formula is as shown:

$$C_{34}H_{30}O_4N_4HgK_2$$

*Example 6*

0.16 grm. of metallic sodium is dissolved in 160 cc. of absolute methanol, and 2.0 grm. of hematoporphyrin is added gradually with stirring thereto at room temperature and dissolved therein. On the other hand, 1.0 grm. of mercuric acetate (0.9 mol) is dissolved in a mixed solution containing 80 cc. of absolute methanol and 20 cc. of pyridine.

The said mercuric acetate solution is added dropwise with stirring to the aforesaid hematoporphyrin-disodium solution in a nitrogen stream over a period of 20 minutes; thereafter, when it is stirred for 30 minutes at a room temperature, the reaction is completed. The reaction solution is filtered; and 650 cc. of ether is added to the filtrate. The disodium mercury complex salt of hematoporphyrin is precipitated out. The precipitate is filtered and dried under reduced pressure in a desiccator. The yield is 2.4 grm. (94.6% of the theoretical yield).

Molecular formula:

$$C_{34}H_{34}O_6N_4HgNa_2$$

Quantitative values:

|   | Analytical value, percent | Theoretical value, percent |
|---|---|---|
| N | 6.47 | 6.65 |
| Hg | 24.1 | 23.8 |

*Example 7*

55 mg. of metallic potassium is dissolved in 40 cc. of absolute methanol and 10 cc. of pyridine is added with stirring thereto at room temperature and then 500 mg. of hematoporphyrin is gradually dissolved therein. On the other hand, 240 mg. (0.9 mol) of mercuric acetate is dissolved in a mixed solution of 16 cc. of absolute methanol and 4 cc. of pyridine, and the solution thus obtained is added dropwise with stirring to the above-mentioned dipotassium solution of hematoporphyrin in a nitrogen stream over a period of about ¼ hour at room temperature. Thereafter, the reaction is completed after a further stirring for ½ hour. When the reaction solution is treated as in Example 6, a dipotassium mercury complex salt of hematoporphyrin is obtained.

Yield: 630 mg. (95.8% of theoretical yield).

Molecular formula:

$$C_{34}H_{34}O_6N_4HgK_2$$

Quantitative value:

|   | Analytical value, percent | Theoretical value, percent |
|---|---|---|
| N | 6.78 | 6.41 |
| Hg | 21.9 | 23.01 |

What we claim is:

1. A mercury hematoporphyrin and its dialkali salts of the following constitutional formula:

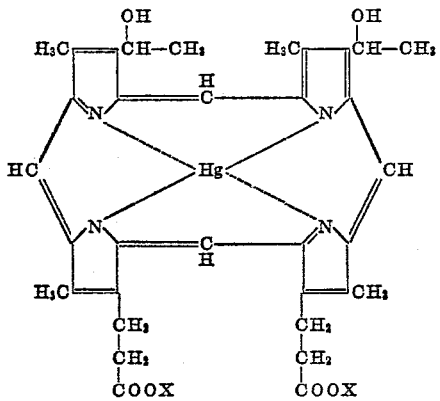

wherein X is selected from the group consisting of hydrogen and alkali metal.

2. A mercury protoporphyrin and its dialkali salts of the following constitutional formula:

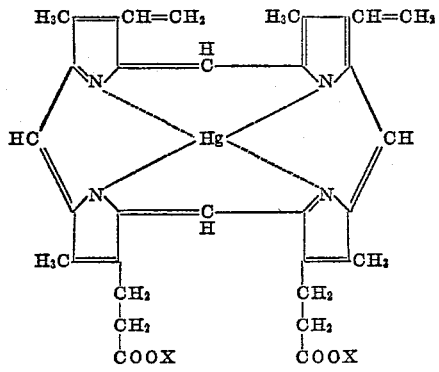

wherein X is selected from the group consisting of hydrogen and alkali metal.

3. A method for preparing dialkali salt of mercury hematoporphyrin, which comprises the steps of producing dialkali salt of hematoporphyrin from alcoholate of alkali metal selected from the group consisting of sodium and potassium and hematoporphyrin with a lower alcohol as solvent, and then reacting the dialkali salt of hematoporphyrin with mercuric acetate solution under an atmosphere of nitrogen gas.

4. A method for preparing dialkali salt of mercury protoporphyrin, which comprises the steps of producing dialkali salt of protoporphyrin from alcoholate of alkali metal selected from the group consisting of sodium and potassium and protoporphyrin with a lower alcohol as solvent, and then reacting the dialkali salt of protoporphyrin with mercuric acetate solution under an atmosphere of nitrogen gas.

References Cited in the file of this patent

UNITED STATES PATENTS

| | | |
|---|---|---|
| 2,274,101 | Snyder | Feb. 24, 1942 |
| 2,476,358 | Diamond et al. | July 19, 1949 |

OTHER REFERENCES

Rothemund: J. Am. Chem. Soc., vol. 60, p. 2005, 1938.

Manufacturing Chemist and Manufacturing Perfumer, vol. 19, pages 438–442 (October 1948).

Wall: Bur. Agr. Ind. Chem., vol. AIC, p. 299, 1951.

Consumer's Reports, vol. 24, #2, p. 88 (1959).

Science, vol. 126, pp. 164–5 (1957).